(12) United States Patent
Nichols

(10) Patent No.: US 7,207,290 B2
(45) Date of Patent: Apr. 24, 2007

(54) ADJUSTABLE ELEVATED SERVING TRAY FOR PETS

(76) Inventor: Jim Quentin Nichols, 5869 Eden Rd., Kennedale, TX (US) 76060

( * ) Notice: Subject to any disclaimer, the term of this patent is extended or adjusted under 35 U.S.C. 154(b) by 309 days.

(21) Appl. No.: 11/005,614

(22) Filed: Dec. 6, 2004

(65) Prior Publication Data

US 2006/0130769 A1 Jun. 22, 2006

(51) Int. Cl.
*A01K 5/00* (2006.01)
*A47B 3/00* (2006.01)

(52) U.S. Cl. .................................. 119/61.5; 108/116

(58) Field of Classification Search .............. 119/61.5, 119/61.53, 61.54, 61.56, 65; 108/12, 14, 108/18, 115, 116, 120, 129, 132; 248/439; D30/121, 128, 129

See application file for complete search history.

(56) References Cited

U.S. PATENT DOCUMENTS

| | | | |
|---|---|---|---|
| 316,363 A * | 4/1885 | Hough | 108/116 |
| 434,240 A | 8/1890 | Bon | |
| 823,699 A | 6/1906 | Roemer | |
| 1,709,927 A | 4/1929 | Whitney | |
| 1,709,928 A | 4/1929 | Whitney | |
| 2,003,241 A | 5/1935 | Brown | |
| 2,127,398 A * | 8/1938 | Freeman | 108/2 |
| 2,758,899 A | 8/1956 | Smith et al. | |
| 2,799,546 A | 7/1957 | Lowry | |
| 2,823,087 A | 2/1958 | Zimmer | |
| 2,843,391 A * | 7/1958 | Pelletier | 280/32.6 |
| 3,094,948 A * | 6/1963 | Clow | 108/10 |
| 3,651,787 A * | 3/1972 | Cooper | 119/51.01 |
| 3,653,715 A * | 4/1972 | Drabert et al. | 297/423.45 |
| 4,044,723 A * | 8/1977 | Fitzpatrick | 119/61.5 |
| 4,296,694 A * | 10/1981 | Kobayashi | 108/116 |
| 4,441,432 A * | 4/1984 | Carlton | 108/5 |
| 4,557,200 A | 12/1985 | Geschwender | |
| 4,610,415 A * | 9/1986 | Miller | 248/455 |
| 4,658,759 A * | 4/1987 | Brown | 119/61.5 |
| 4,861,100 A * | 8/1989 | Baccaro | 297/19 |
| 4,993,706 A * | 2/1991 | Wilkinson | 482/142 |
| 5,464,268 A * | 11/1995 | Levrangi | 297/57 |
| D375,818 S * | 11/1996 | Fischer | D30/130 |
| 5,588,377 A * | 12/1996 | Fahmian | 108/145 |
| D424,759 S * | 5/2000 | Sipka | D30/130 |
| 6,321,921 B1 * | 11/2001 | Massoudnia | 211/188 |
| 6,401,630 B1 | 6/2002 | Peterson | |
| 6,561,107 B1 * | 5/2003 | Wood et al. | 108/132 |
| D506,294 S * | 6/2005 | Boje | D30/133 |
| D521,690 S * | 5/2006 | Krcek et al. | D30/133 |

* cited by examiner

*Primary Examiner*—Yvonne R. Abbott
(74) *Attorney, Agent, or Firm*—Lynn E. Barber

(57) ABSTRACT

An adjustable elevated serving tray for pets and having a tray portion accepting various dish sizes and shapes, leg position brackets on the bottom or sides of the tray portion, and two legs fastenable in any one of multiple possible positions beneath the tray portion by means of angled slots in the leg position brackets.

9 Claims, 5 Drawing Sheets

ADJUSTABLE ELEVATED SERVING TRAY FOR PETS

BACKGROUND OF THE INVENTION

1. Field of the Invention

This invention relates to animal feeding apparatuses, and in particular relates to an adjustable elevated serving tray for pets.

2. Description of the Related Art

Typically, animals such as dogs and cats are fed in dishes placed at floor level. It is known, however, that it may be injurious to the health of an animal, particularly a large animal, to eat at floor level. In addition, feed containers placed on the floor are easily accessible to crawling insects.

Thus, elevated pet feeders have been developed such as the pet dining table of Steininger (U.S. Pat. No. Des. 377,244) and the dog feeder of Fahmie (U.S. Pat. No. 4,065,195), which is composed of a top panel with holes to receive feeding pans, and three hinged support panels that hold the top panel above the floor level and that may be collapsed in coplanar position to be portable. The pet feeder of Teschke (U.S. Pat. No. 4,699,089) elevates a removable feeding table by placing it on a feed storage container.

It has been recognized, however, that having a fixed height feeder does not allow the pet owner to make adjustments for differently sized pets. Patents addressing this problem include U.S. Pat. No. 4,044,723 of Fitzpatrick, which provides a table supported by legs to hold the food dishes. The legs may be detachably secured to the table so that one set of legs may be replaced by another set of legs of a different length as is desired.

The feeding tray means of Brown (U.S. Pat. No. 4,658,759) has an elevated rectangular plate having extendible legs hinged to the bottom of the plate. The feeder holder of Altman (U.S. Pat. No. 5,429,071) provides two pairs of rigid L-shaped legs, each of which has slots so that U-shaped brackets may be inserted in opposing aligned slots to define a platform for holding a feeder above a pan of water to keep crawling insects from getting to the feed. The pet food serving apparatus of Mersits et al. (U.S. Publication No. US2003/0106498) also elevates a food tray above a moat, and may be adjusted in height by means of threaded leg sections, by vertical spacers, or by cut-out notches in the leg for insertion of the food tray.

The adjustable animal feeder of Lemkin (U.S. Pat. No. 6,145,474) has two molded plastic components: an upwardly opening hollow base, and a downwardly opening hollow cover for holding bowls. There are ribs spaced about the interior of the cover and grooves spaced about the perimeter of the base, so that when the cover is placed in one position, the ribs slide down the grooves and the bowls are in a lowered position, and when the cover is placed in another position, the ribs rest on the upper ends of the walls of the base and the bowls are in an elevated position.

The trough support of Swinney (U.S. Pat. No. 3,145,007) utilizes stanchions which have a trough carrying sleeve surrounding the stanchion, and a pawl and ratchet mechanism to change the height of the trough.

The adjustable pet feeding stand of Cooper (U.S. Pat. No. 3,651,787) has side walls with apertured leg portions, and apertured extensible support members that may be held in different positions with respect to the leg portions by means of fastening elements placed through the apertures.

Patents providing vertical structures upon which the height of feeders may be adjusted include U.S. Pat. No. Des. 424,758 of Akopdjanov (double bowl structure positionable at any one of a number of holes in the vertical structure), U.S. Pat. No. 4,205,629 of Wix (horizontal frame for holding bowls at different heights on a mounted support member), U.S. Pat. No. 5,000,124 of Bergen (wall mounting apparatus having a trigger and brake device so that bowl can be held at a particular elevation), U.S. Pat. No. 5,501,176 of Tully (bracket with horizontal slots has a tray attached to any one of the horizontal slots by means of a hinge), and U.S. Pat. No. 4,976,223 of Pierce (support base with at least two arms extending upwardly and having means to engage a food dish support plate).

Other adjustable feeders have multiple legs which may be adjusted in position to change the height of the feeder, such as U.S. Pat. No. 2,165,968 of Hill (legs adjusted longitudinally through slots.

Many prior feeding devices have a very complicated or bulky structure making them difficult to construct and/or to move from position to position, or they are not adjustable in height at all, or have very limited adjustability. Others have an opening or hole which only accepts a particular sized dish.

It is therefore an object of the invention to provide an adjustable elevated serving tray for pets that is adjustable to multiple heights, is easily constructed, assembled and disassembled, and movable from one position to another.

It is a further object of the invention to provide a serving tray for pets that holds the pet's dishes in place yet does not limit the dish size substantially.

Other objects and advantages will be more fully apparent from the following disclosure and appended claims.

SUMMARY OF THE INVENTION

The invention herein is an adjustable elevated serving tray for pets and has a tray portion accepting various dish sizes and shapes, leg position brackets on the bottom of the tray portion, and two legs fastenable in any one of multiple possible positions beneath the tray portion by means of angled slots in the leg position brackets.

Other objects and features of the inventions will be more fully apparent from the following disclosure and appended claims.

DETAILED DESCRIPTION OF THE INVENTION AND PREFERRED EMBODIMENTS THEREOF

The present invention provides an elevated serving tray providing a functional, economic and attractive method to elevate serving dishes to the correct height for small animals and pets, such as dogs and cats, enhancing digestion, improving accessibility to the food and water dishes, containing food spills and decreasing pest access to the dishes. The height adjustment of the feeding tray is simply done, without the use of tools or supplementary fasteners. The desired height adjustment may be easily chosen and accomplished for each of the two legs, and the desired height is thus locked into position so that it is not accidentally changed. At each of the possible tray heights, the invention provides the same stability. In the preferred embodiment having an raised edge around the tray, both liquid and solid spills from the animal's dishes is contained. In the embodiment having a tray insert, the dishes are held in place by increased friction. The tray enables many different styles and sizes of dishes may be accommodated on the serving tray. The tray may be easily moved from one location to another without changing the height setting.

Figure 1:
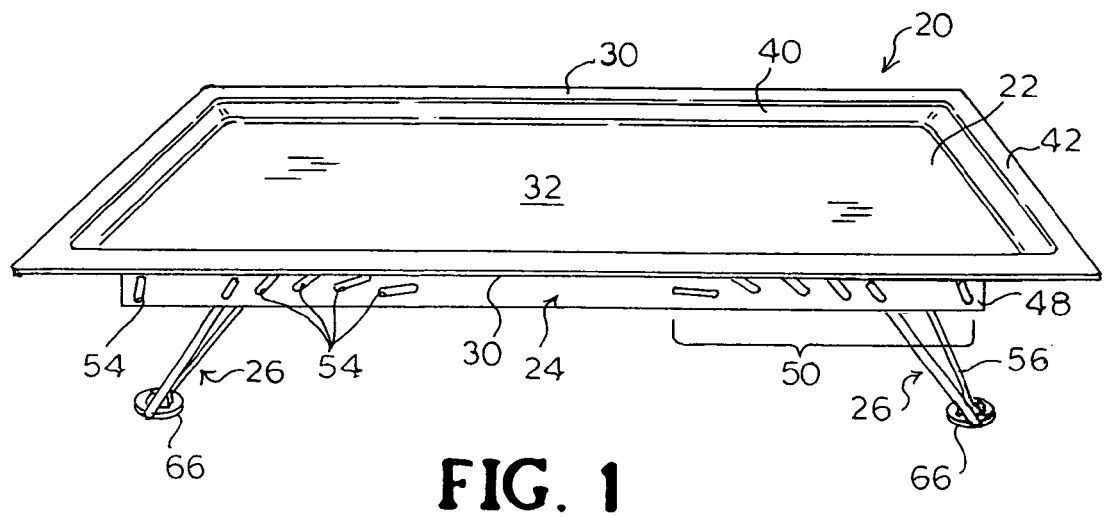
FIG. 1 is a perspective side view of an elevated serving tray according to the invention herein.
Figure 2:
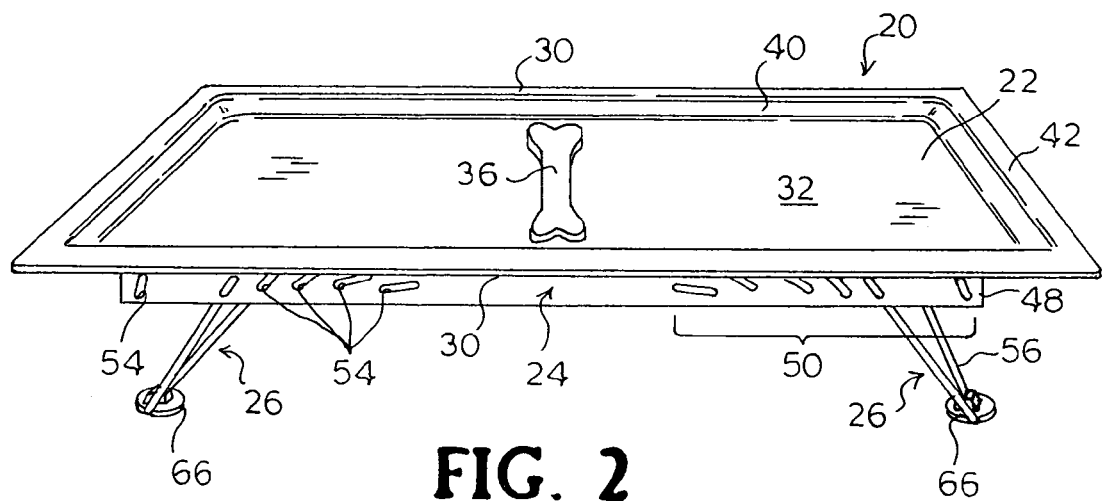
FIG. 2 is a perspective side view of an elevated serving tray of the invention having a central divider.

Referring now to the figures, the elevated serving tray 20 of the invention herein comprises a tray portion 22, leg position brackets 24, and two legs 26 (FIG. 1). The tray portion 22 is preferably a one piece shape, such as rectangular as shown, to accept various dish sizes and shapes. It is preferably made of metal, such as stainless steel, carbon steel, aluminum, etc. or other sturdy, easy to clean material such as certain plastics known in the art. In the preferred embodiment, the tray portion 22 accommodates two dishes 28. The rectangular preferred tray portion has two opposing sides 30, and an upper planar surface 32 and a lower surface 34. Preferably, there is also a raised portion 36 in the center of the upper planar surface 32 of the tray portion 22 that creates a divider or separator for the two dishes 28 (FIG. 2), for example, in the shape of a dog-bone as shown, raised about ¼ inch above the tray surface.

Figure 13:
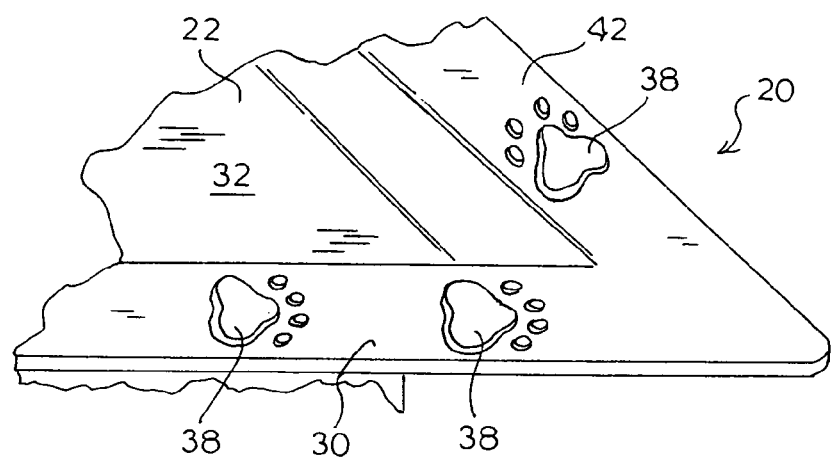
FIG. 13 is a partial perspective view of a raised design around the edge of the elevated serving tray of the invention.

Preferably, the tray portion 22 also has a raised edge 40 extending around the perimeter of the entire upper planar surface 32 as shown in FIG. 1. This raised edge 40 keeps spilled food and water, as well as shoved food and water dishes, from going on the floor. It also increases the structural strength of the tray portion 22 and improves its appearance. In the preferred embodiment, there is also a horizontal rim 42 at the top of the raised edge 40, which augments the strength and appearance. There also may be embossed or painted designs 38, such as the series of raised paw print designs as shown in FIG. 13 on the horizontal rim 42 to further improve the appearance.

Figure 3:
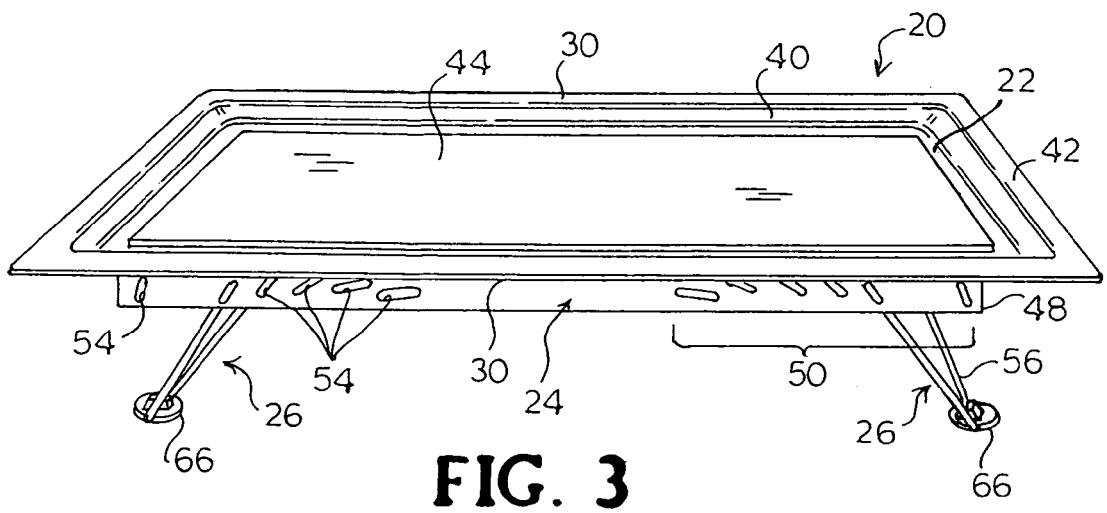
FIG. 3 is a perspective side view of an elevated serving tray of the invention having a tray insert.

The invention herein preferably also comprises a flat removable tray insert 44 that fits within the area defined by the raised edge 40 on the upper planar surface 32 (FIG. 3). The tray insert 44 is made of an anti-slip material, such as rubber or plastic with anti-slip properties. It also can be made in decorative fashion to add to the overall design.

Figure 4:
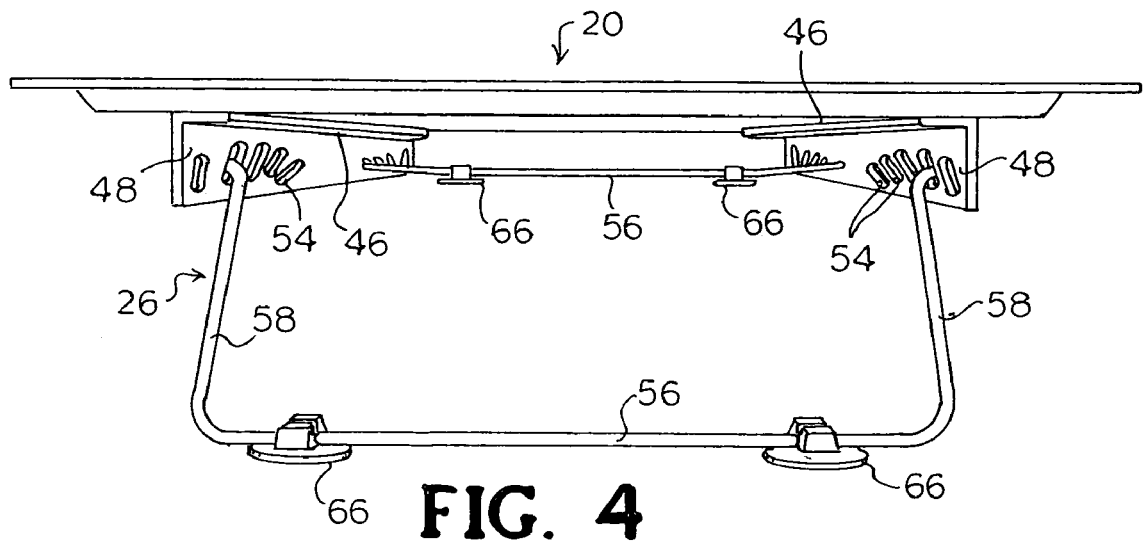
FIG. 4 is an end perspective view of the elevated serving tray of the invention.
Figure 5:
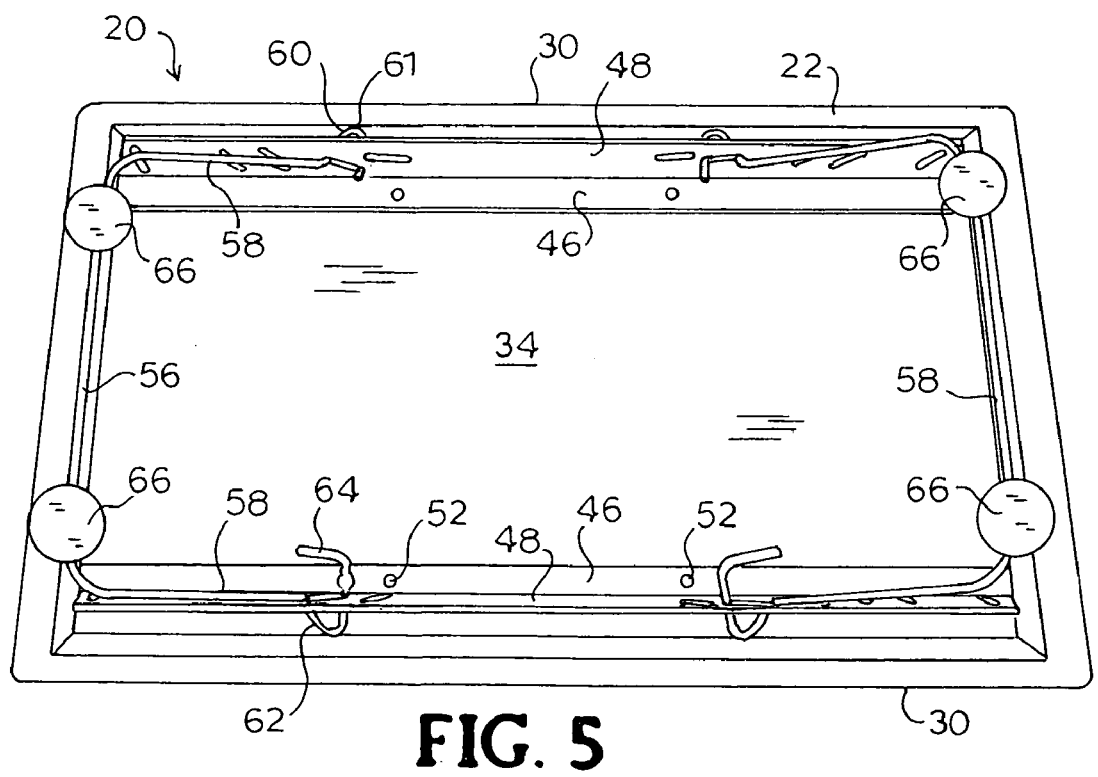
FIG. 5 is a bottom perspective view of the elevated serving tray of the invention.

The two leg position brackets 24 are attached to the lower surface 34 parallel to each other, with a leg position bracket 24 positioned on each of the opposing sides 30 of the tray portion 22. The bracket 24 may also be attached to the side of the tray portion 22. Each leg position bracket 24 is preferably made of a flat metal bent to form an angle, with a horizontal face 46 of the angle iron piece attached to the lower surface 34 of the tray portion 22 as shown in FIGS. 4–5 and the other face comprising an side portion 48 having two ends 50. The cross-sectional L-shape of the leg position bracket 24 functions as a structural support as well as a leg position holder. The side portion 48 of each leg position bracket 24 is parallel with and identical to the other side portion 48 of the other leg position bracket 24. The leg position brackets 24 are preferably attached to the lower surface 34 of the tray portion 22 by rivets 52 (FIG. 5) so that once the tray portion 22 and leg position brackets 24 are attached together, they may be coated and sealed individually to ensure 100% coverage. Separate coating of the individual parts prior to assembly minimizes the chance for rust formation or corrosion in the joined areas when made from metal. Other methods of attachment known in the art may be used such as welding and gluing.

There are multiple angled height adjustment slots 54 located at each of the two ends 50 for insertion of the leg ends as discussed below. The term "angled" as used herein, means at an angle (0–90 degrees) from the horizontal tray surface. Preferably there are at least three angled height adjustment slots 54 on each end 50 of each side portion, and most preferably there are at least fiv slots 54 on each end 50. When the leg is in the horizontal slot, the pet food is very close to the ground surface, but slightly above the floor with the leg between the tray and the floor. This arrangement allows the tray to be level and keeps the legs together with the tray for future use of the legs in the more elevated tray positions.

Figure 6:
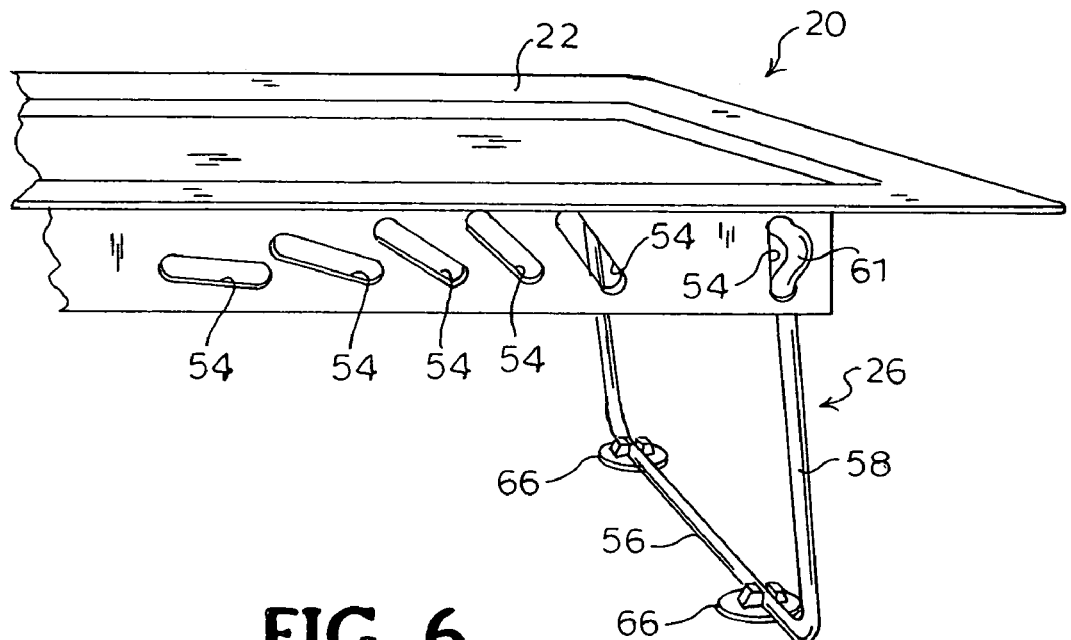
FIG. 6 is a partial perspective side view of the elevated serving tray of the invention showing a preferred arrangement of 6 slots at each end of each side, with the leg in the distal slot.

A preferred arrangement of angled height adjustment slots 54 is shown in FIG. 6. As shown, each angled height adjustment slot 54 at each end 50 of the two ends of a particular side portion 48 is at a different angle than the other angled height adjustment slots 54 at that end 50. In the preferred embodiment, there is a vertical angled height adjustment slot 54 (a slot that is within 0–10 degrees of being vertical), a horizontal angled height adjustment slot 54 (a slot that is within 0–10 degrees of being horizontal), and at least one angled height adjustment slot 54 that is neither horizontal nor vertical. Most preferably, there are at least 3–4 such angled slots that are neither horizontal nor vertical as shown in FIG. 6. This arrangement allows the fixed length leg assembly that is made up of the two legs 26 and the tray portion 22 to be placed in such a way as to maximize tray stability as the height of the tray changes. The angled height adjustment slots also provide easy and clear access for the user to hold the legs 24 while making any adjustments.

The position and angle of the angled height adjustment slots 54 on the two ends 50 of each side portion 48 are in mirror image relationship with each other (FIG. 1), and are identical to the position and angle of corresponding angled height adjustment slots 54 on the corresponding end 50 of the other side portion 48.

Figure 8:
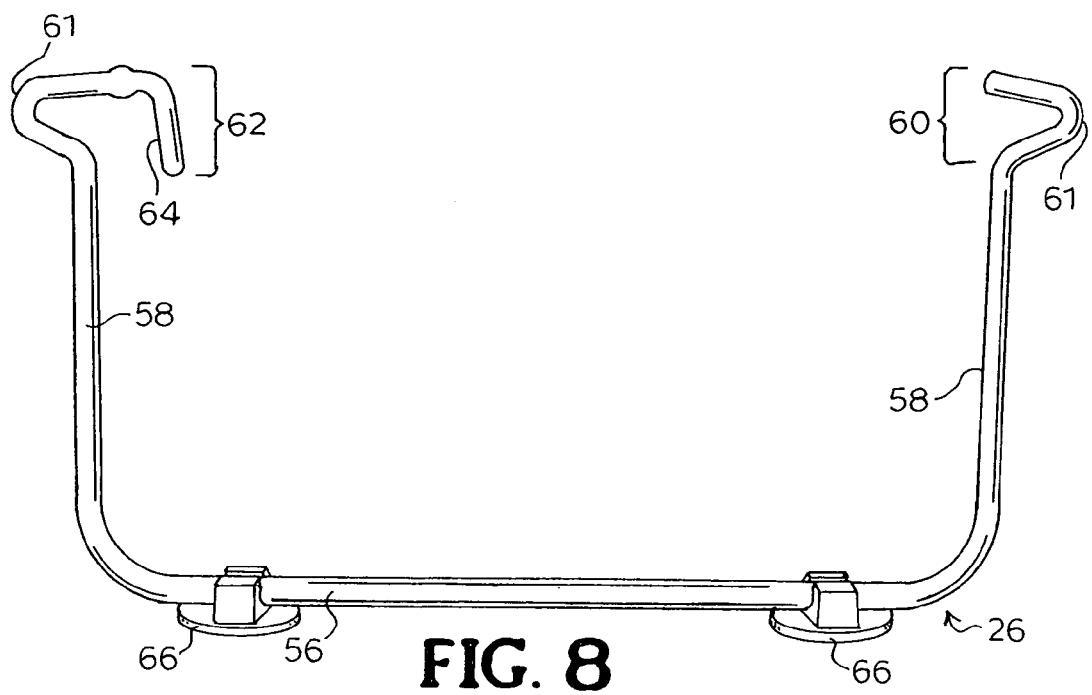
FIG. 8 is a perspective side view of a leg of the elevated serving tray of the invention.
Figure 9:
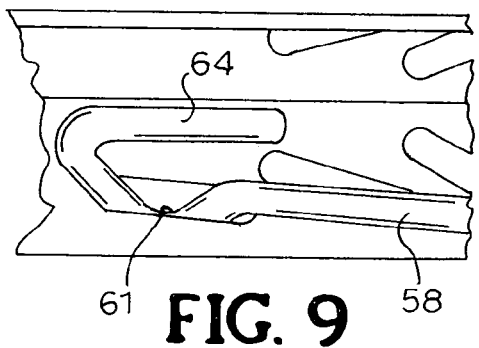
FIG. 9 is a close-up perspective view of an adjustment loop at the end of a leg of the elevated serving tray of the invention.

Each of the two legs 26 (FIG. 8) is preferably made in one piece, and comprises a base portion 56 and two upright portions 58 having bent ends, one of which bent ends is preferably a position locator 60 and the other bent end is preferably an adjustment loop 62 on the other upright portion 58 of each leg 26, both of which are shown in FIG. 8. Alternatively, both ends may have an adjustment loop 62. The angled sloped edges of the position locator 60 ensure a secure and snug fit into the selected height adjustment slot 54, and an easy slip in-and-out process, with bend 61 fitting into the selected angled height adjustment slot 54. The adjustment loop 62, which has the angled sloped edges as in the position locator 60 and bend 61, plus a grasping portion 64 (FIG. 8) provides an easy access for the user to hold the leg 26 while making any adjustments. Positioning of bend 61 of adjustment loop 62 is shown in FIG. 9 as viewed from beneath the tray portion 22 and between leg position brackets 24. The relative length, stiffness and spring action of the preferred leg structure 26 improves leg stability, provides positioning ease, and enhances the design aesthetics of the invention.

Figure 7:
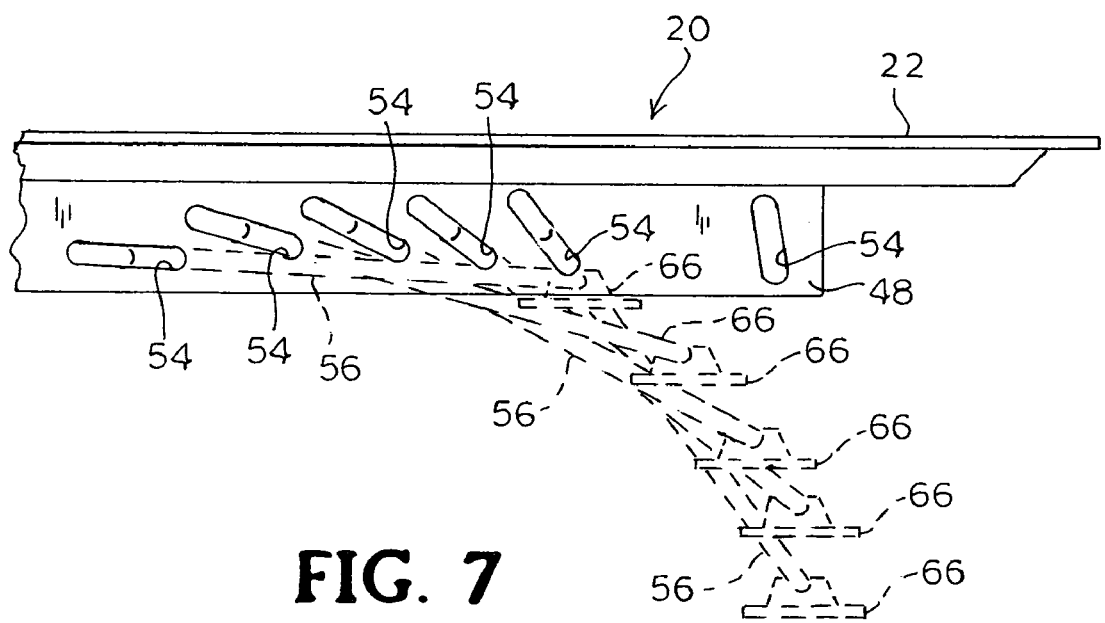
FIG. 7 is a partial side elevational view of the elevated serving tray of the invention showing alternative positionings of the legs in the slots.

Each of the legs 26 is removably attachable to the two leg position brackets 24 by insertion of the position locator 60 and the adjustment loop 62 into identically angled selected angled height adjustment slots 54 on the side portions 48. As is shown in FIG. 7, placement of the position locator 60 and adjustment loop 62 in the slots that are close to horizontal and at an acute angle to the plane of the tray upper planar surface 32 (and to the ground or floor surface G upon which the tray and legs rests) causes the tray portion 22 to be lowered with respect to the ground or floor surface. Placement of the position locator 60 and adjustment loop 62 in angled height adjustment slots 54 that are nearly vertical causes the tray portion 22 to remain horizontal, but be raised a greater distance from the ground surface G. Placement of the position locator 60 and adjustment loop 62 in angled height adjustment slots 54 at an angle between horizontal and vertical causes the horizontal tray portion 22 to be at an intermediate height.

Figure 10:
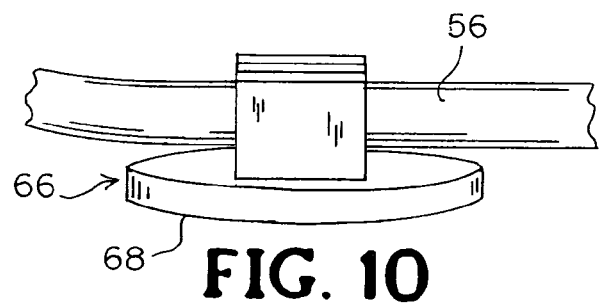
FIG. 10 is a side elevational view of a floor protector attached to a leg on the elevated serving tray of the invention.
Figure 11:
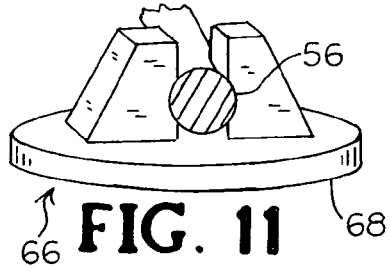
FIG. 11 is a perspective view of the floor protector of FIG. 10.

The invention preferably also comprises two floor protectors 66 attached to each of the leg base portions 56 as shown in FIGS. 10–11. Examples of floor protectors that may be used are black poly hair pin glides to fit ¼-inch OD wire with 1 7/16-inch OD base, as may be obtained from Superior Components (Plainfield, Ill.). These floor protectors 66 are attached as is known in the art to be pivotable about the leg base portions 56 so that the base surface 68 of the floor protectors 66 may lie flat on the floor no matter what position the leg 26 to which it is attached is in with respect to the tray portion 22 and floor. The floor protectors 66 provide added insurance for tray stability as well as providing protection from floor scarring and anti-skid protection.

Although the tray 20 of the invention may be constructed in many different sizes and proportions, it has been found that the following dimensions provide a tray usable for most dogs and cats: rim: 1-inch wide, small tray inner dimensions: 7.25×14.5 inches; medium tray inner dimensions: 11×25 inches; large tray: 14.5×30 inches; tray raised edge 0.5 inch high; leg base portion length-appropriate to width of tray; leg upright portion length—5.5 inches; leg diameter—¼ inch; and elongated slot—1.2×0.3 inch. For a small tray, it is preferred to have five leg positions allowing the height to be raised from about 2 inches to about 6 inches in 1-inch increments, for a medium tray, it is preferred to have six leg positions allowing the height to be raised from about 3 inches to about 10.5 inches in 1.5 inch increments, and for a large tray, it is preferred to have six leg positions allowing the height to be raised from 7 to 17 inches in 1.5 inch increments.

Figure 12:
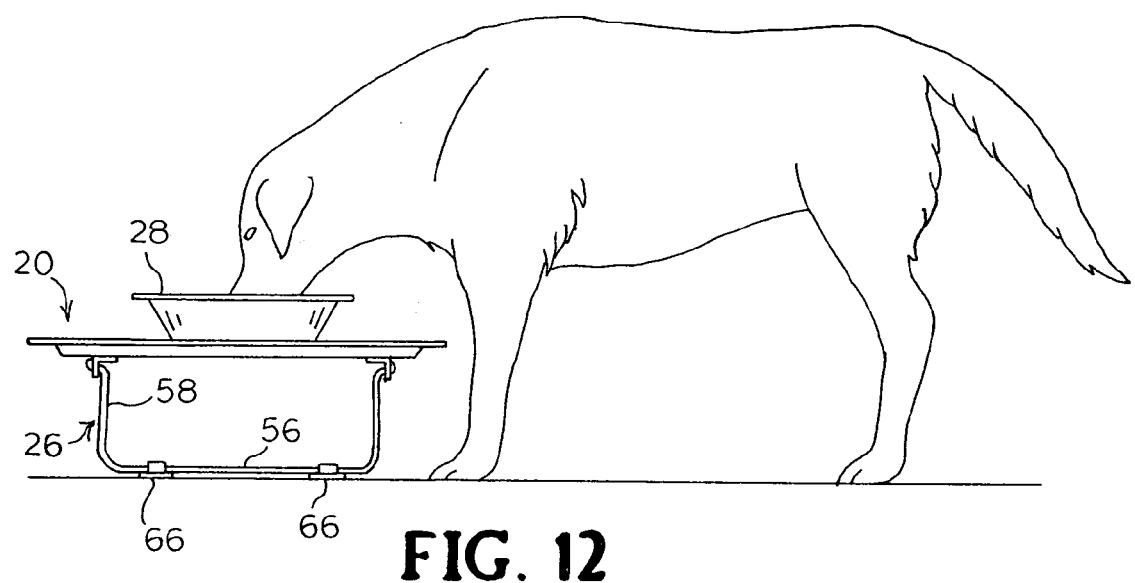
FIG. 12 is a side elevational view of the elevated serving tray in use.

An example of use of the elevated serving tray 20 of the invention is shown in FIG. 12.

While the invention has been described with reference to specific embodiments, it will be appreciated that numerous variations, modifications, and embodiments are possible, and accordingly, all such variations, modifications, and embodiments are to be regarded as being within the spirit and scope of the invention.

What is claimed is:

1. An adjustable elevated serving tray for pets, comprising:
   a) a tray portion having two opposing sides, and an upper planar surface and a lower surface;
   b) two leg position brackets positioned on the tray portion parallel to each other along the opposing sides of the rectangular tray, the two leg position brackets having identical parallel side portions, each side portion having two ends, and having multiple angled height adjustment slots located at each of the two ends;
   wherein each angled height adjustment slot at each end of the two ends of a particular side portion is at a different angle than the other angled height adjustment slots at that end, with the position and angle of each of the angled height adjustment slots on one of the two ends of each side portion being in mirror image relationship with an angled height adjustment slot on the other end of the same side portion, and identical to the position and angle of a corresponding angled height adjustment slot on the other side portion; and
   c) two legs, each leg having a base portion, two upright portions and two bent ends, each of the legs being removably attachable to the two leg position brackets by insertion of one bent end into one angled height adjustment slot on one of the side portions and insertion of the other bent end into the angled height adjustment slot having the identical position and angle on the other side portion.

2. The adjustable elevated serving tray according to claim 1, further comprising a tray insert placed on the upper planar surface.

3. The adjustable elevated serving tray according to claim 1, further comprising a raised edge around the upper surface.

4. The adjustable elevated serving tray according to claim 3, further comprising a tray insert placed on the upper planar surface.

5. The adjustable elevated serving tray according to claim 1, wherein one of the bent ends comprises a position locater and the other bent end comprises an adjustment loop.

6. The adjustable elevated serving tray according to claim 1, wherein each bent end comprises an adjustment loop.

7. The adjustable elevated serving tray according to claim 1, further comprising a central divider.

8. The adjustable elevated serving tray according to claim 1, further comprising a plurality of floor protectors attached to each leg base portion.

9. The adjustable elevated serving tray according to claim 1, wherein there are at least three angled height adjustment slots on each end of each side portion.

\* \* \* \* \*